March 7, 1933.  J. H. GREENLEY  1,899,956
SPEED AND TIME RECORDER
Filed March 29, 1929  4 Sheets-Sheet 1
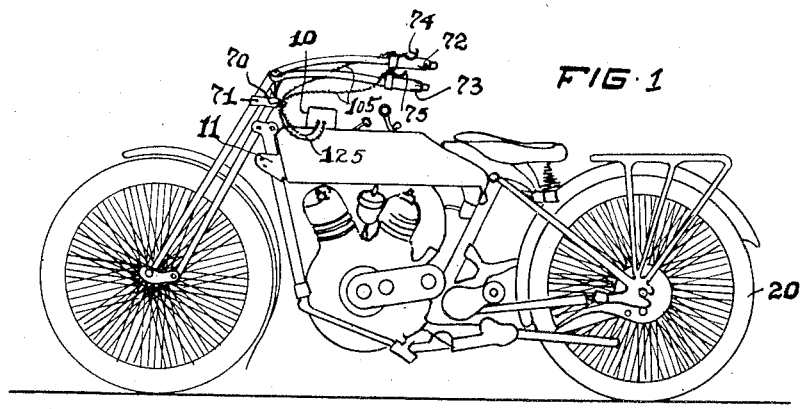
FIG.1
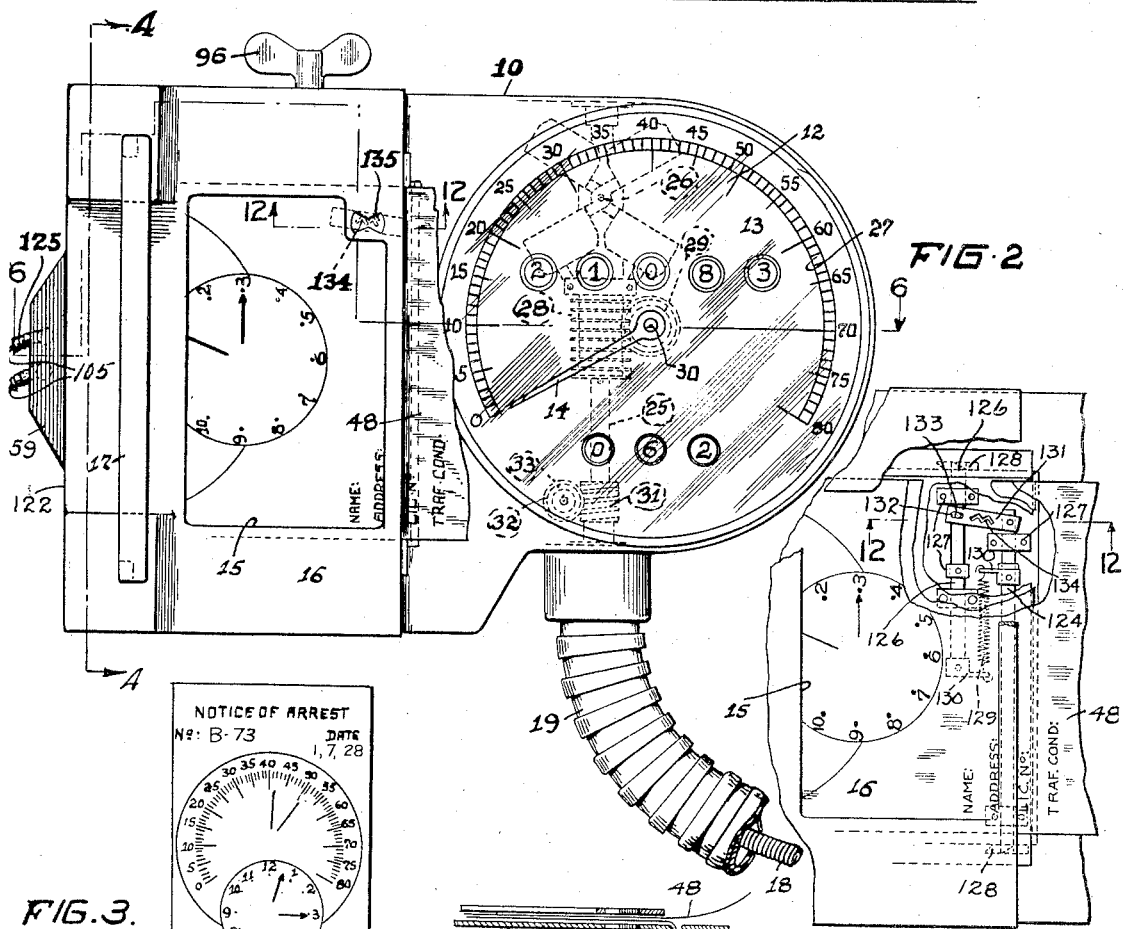
FIG.2
FIG.3
FIG.11
FIG.12
Inventor
JAY H. GREENLEY
By Frank D. Gray
Attorney

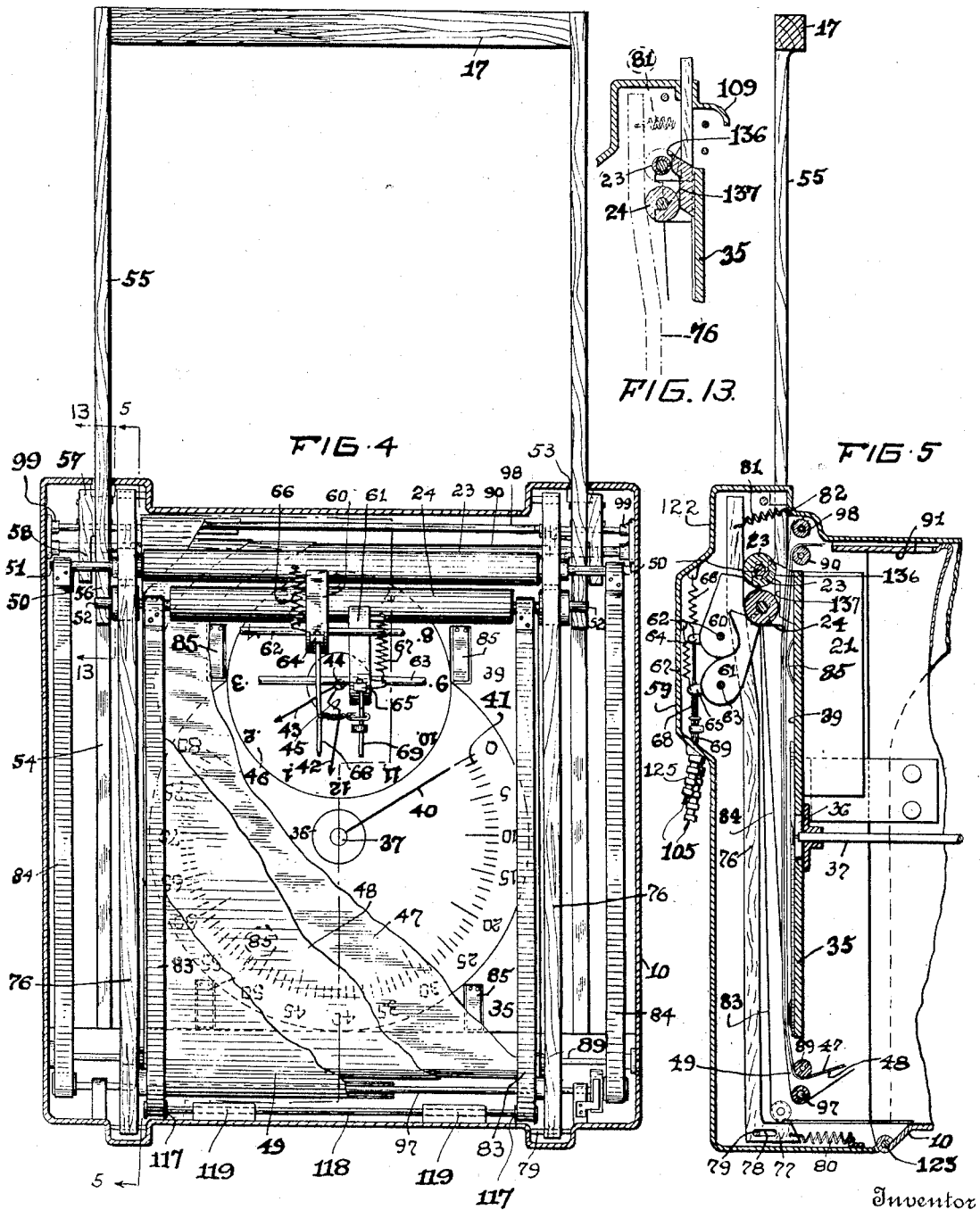

March 7, 1933.  J. H. GREENLEY  1,899,956
SPEED AND TIME RECORDER
Filed March 29, 1929  4 Sheets-Sheet 3
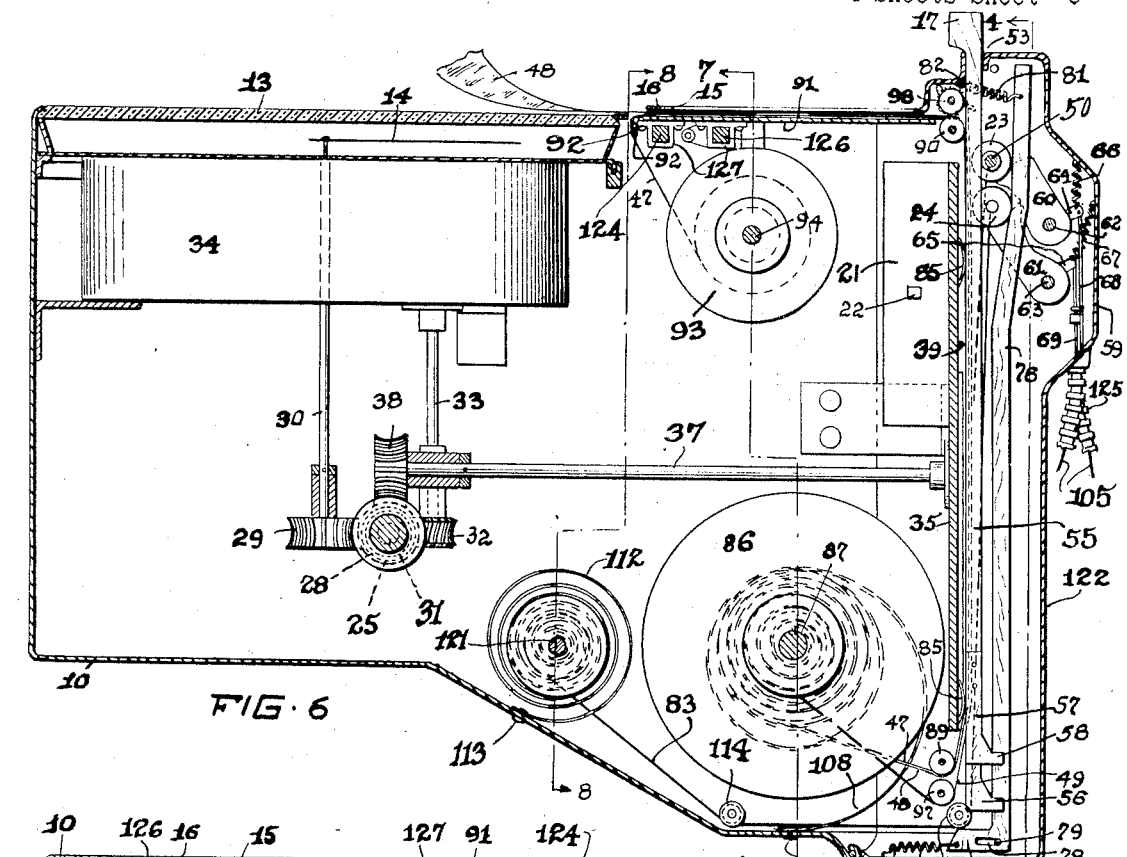
FIG. 6
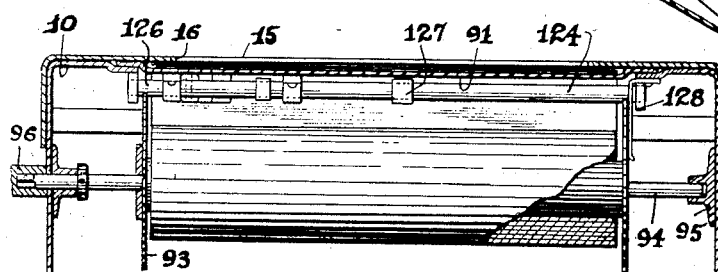
FIG. 7
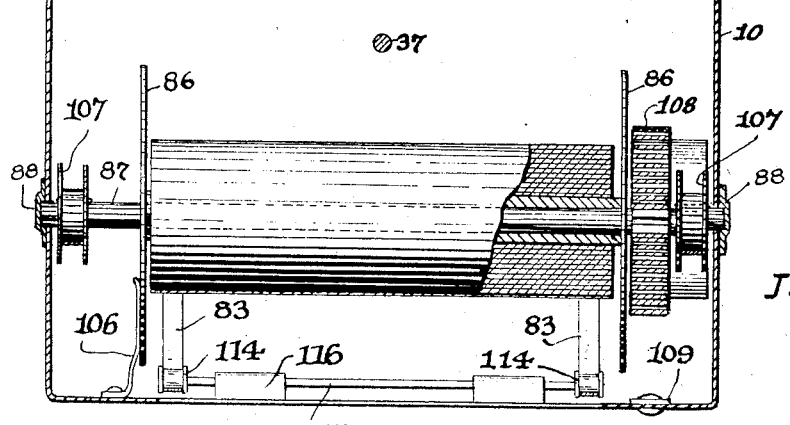
Inventor
JAY H. GREENLEY
Frank D. Gray
Attorney March 7, 1933.                J. H. GREENLEY                 1,899,956
                            SPEED AND TIME RECORDER
                             Filed March 29, 1929          4 Sheets-Sheet 4

Inventor
JAY H. GREENLEY
Frank D. Gray
Attorney

Patented Mar. 7, 1933

1,899,956

UNITED STATES PATENT OFFICE

JAY HIRAM GREENLEY, OF BUFFALO, NEW YORK

SPEED AND TIME RECORDER

Application filed March 29, 1929. Serial No. 351,065.

This invention relates to speed and time recorders, and has for its object to provide an instrument for use in connection with motor vehicles, for permanently recording upon a flexible sheet a diagram indicating the speed of the vehicle at any given instant together with a diagram showing the minute and hour when the record was made.

Another object of the invention is to provide in a casing a standard time piece whose hands are mounted properly to sustain thereon a reasonable pressure when a record of the time is to be made, and also a speedometer whose hand indicating the varying speed of the vehicle, will be in the same plane as the hands of the time piece, so that a printed record of the position of the three hands may be made by pressure exerted thereby upon a plurality of plies of flexible material, some of which shall be carbon sheets for an obvious purpose.

A further object of the invention is to provide such a print recording device in which the pressure exerted upon the flexible strips, one or more of which will be copies, for printing the record for a given moment, will be actuated while both the speedometer hand and the flexible strips will be in a substantially stationary position when the record is printed, but will permit lengthwise movement of the several strips in the intervals between the times when the printing pressure is exerted.

It is a further object of this invention to provide means for advancing the printed strips after receiving thereon the impress of the characters indicating the speed and time, to a convenient opening in the case of the recorder where it will be convenient to fill in certain data relating to the printed record, and thereafter to mechanically separate two or more printed strips bearing thereon identical records, so that at least one of the completed strips may be severed from the continuous strip, while another completed strip may be reeled up in its continuous condition and protected within the body of the instrument.

Another object of my invention is to provide means for advancing superposed printed strips, one of which is a copy, after receiving a record thereon, and are later to be separated, and to mount the three hands for the recording operation and their related mechanism, within a portion of the instrument which may be pivoted to the main body of the instrument, and provided with a locking means whereby the pivoted portion can only be released by the use of a key for operating the lock, so that the main record strip reeled up after the detached strip portions have been disconnected, cannot be tampered with by unauthorized parties. I contemplate positioning the lock where inserting the key will require puncturing the recorded strip.

It is a still further object of my invention to provide movable pressure rolls normally actuated automatically to press the flexible strips against the printing devices with spring latch means to prevent their movement across the printing devices prematurely and in combination with manually operable means upon the steering device of a vehicle, such as the handle bars of a motorcycle, having mechanical connection with releasing means for the said latch means.

I have illustrated the recording device as mounted upon a motorcycle frame, but of course the instrument may be easily mounted upon any wheeled vehicles whose speed at any instant of time it is desirable to record.

Other objects will appear and will be described and their results explained as the construction is described in detail.

In the accompanying drawings presented for illustrating my invention

Figure 1 is a side elevation of a motorcycle having a speed indicator and recorder mounted thereon;

Figure 2 is a plan view of a speed indicator and recorder device showing the face of a speedometer and a casing opening showing a dial and a record strip as it has advanced from the printing mechanism therein;

Figure 3 is a view of a record sheet having the recorded data thereon;

Figure 4 is a transverse sectional view of the instrument shown in the plane indicated by the line 4—4 of Figs. 2 and 6;

Figure 5 is a transverse, vertical section taken in the plane indicated by the broken line 5—5 of Fig. 4;

Figure 6 is a longitudinal section of the instrument taken in the plane indicated by the line 6—6 of Fig. 2;

Figure 7 is a transverse sectional view taken on the line 7—7 of Fig. 6;

Figure 11 is a plan view of the locking mechanism for the casing, with certain parts broken away;

Figure 8:
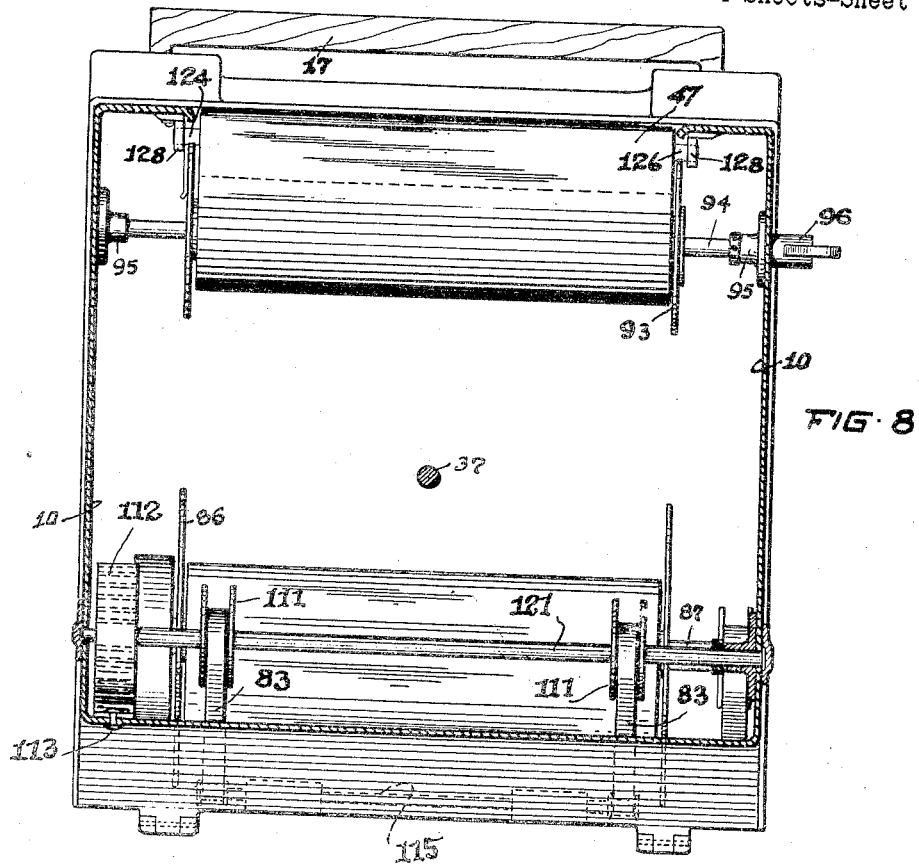
Figure 8 is a transverse sectional view taken on the plane indicated by the line 8—8 of Fig. 6, and looking in the direction of the arrows.
Figures 9, 10:
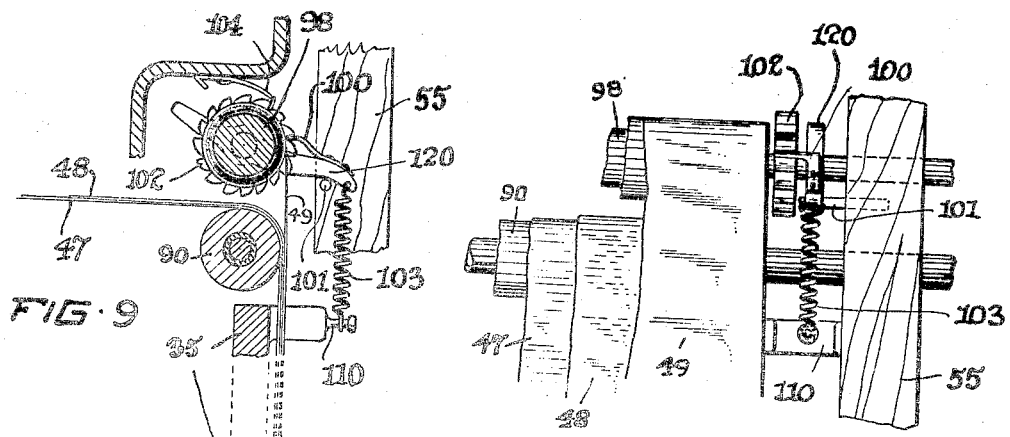
Figure 9 is a diagrammatic view of the strip feeding mechanism shown in vertical section in a plane transverse of the vehicle frame.
Figure 10 is a view of certain parts of said mechanism shown at right angles to that in Fig. 9.

Figure 12 is a sectional view of the same taken in the plane indicated by the line 12—12 in Figs. 2 and 11, and Figure 13 is a fragmentary section of the guide means for the pressure roll, taken in the plane indicated by the line 13—13 of Fig. 4.

My recording instrument for purposes of illustration, has been shown as mounted within a casing 10 supported upon the usual upper frame bar 11 of a motorcycle, the said casing being somewhat elongated in a direction transverse of the bar, and disclosing in its upper face a speedometer dial 12 covered by a glass face 13 through which will be shown a speed hand 14, at one end of the instrument, and an open space 15 in the metal frame plate 16 at the opposite end of the casing, together with a view of the operating mechanism of the printing device, the manually operable frame 17 being indicated as adapted for vertical reciprocation.

My recording instrument includes a speedometer actuating means including a flexible drive shaft 18 protected by the conventional armor 19 mounted in the casing 10, and operatively connected with and actuated by the wheel 20 of the vehicle, in the more or less usual manner. It further includes a time piece 21 mounted vertically in the main frame 10, and provided with winding stem 22 in the ordinary manner. A printing mechanism is provided by the movement of pressing rolls 23 and 24 over the surface of strips upon which the record is to be made, the rate of travel of the vehicle and the time the record was taken, being impressed on certain of said strips by the rolls, as will later be described in detail.

The shaft 18 is rotated by its connection with the wheel 20 and in turn actuates the shaft 25 within the casing 10 for rotation on bearings therein which latter in the conventional manner permit lengthwise movement of rack 28 while shaft 25 is rotating. The usual centrifugal mechanism 26 by such shaft rotation, actuates the endwise movement of said rack, which in opposition to the normal resistance of a spring (not shown), moves the speed hand 14 variably to indicate upon the scale 27 the speed of the vehicle at a given moment. The gearing connection between the parts 14 and 25 is made by the provision of the cylindrical rack 28 engaging the gear 29 mounted upon the vertical shaft 30 bearing the said speed hand 14.

The shaft 25 is an extension of the shaft 18 and bears somewhat spaced from the cylinder 28, a worm 31 whose rotation, by engagement with the worm gear 32, rotates the shaft 33 which in turn drives the main indicator of the speedometer, including the usual mileage register of the vehicle. The general construction of the said speedometer and register, all mounted within suitable protective casing 34, will not be further described, since it is quite conventional, and will not be claimed in this application.

Near the printing mechanism of the instrument, a metal plate 35 is mounted vertically within the casing 10 and secured thereto. The time piece 21 is mounted upon the said plate on the inner side thereof. The plate 35 has a central aperture 36 through which extends a horizontal actuating shaft 37 upon whose inner end is secured the gear 38 which is in mesh with the aforesaid cylindrical rack 28 carried by the shaft 25. Upon the outer surface 39 of the plate 35, a scale 41 is shown somewhat similar to the scale 27 on the upper surface of the speedometer, and on which a hand 40 mounted upon the outer end of shaft 37 indicates the varying speed of the vehicle. The hand is therefore movable, but the scale 41 is indicated on the plate by raised characters of the nature of printing type capable of making suitable impression upon flexible strips to serve as a permanent record. Further details of this scale will be disclosed later.

From the above description and the drawings it will be clear that the shaft 25, rotated by the flexible shaft 18, will by the centrifugal force of the mechanism 26, operate the hand 14 and the hand 40 by longitudinal movement of the rack 28 engaging gears 29 and 38, respectively, and will also register the total mileage by engagement of the spiral 32 by the worm 31. The hand 14 serves to inform the driver of his present speed, while hand 40 affords means of recording the speed at a given moment.

The time piece 21 is of quite conventional construction, the minute and hour hands 42 and 43, respectively, being mounted upon and driven by the horizontal shaft 44 projecting forwardly from casing 21 and out through an opening in the plate 35 to present the hands 42 and 43 in a common plane with the speed hand 40, the said hands all having rear support by said plate 35 to sustain pressure thereon on their face for printing the record of all.

Since the speed hand 40 in its rotation moves through the arc travelled by the hands 42 and 43 of the time piece, it is appreciated that possible danger of entanglement might arise by the hand 40 striking the long hand 42 as the latter is moving to the left, in the relative positions shown in Fig. 4. For this reason, the minute hand 42 is provided with an offset portion 45 which is just slightly nearer the pivot 44 than the end of the hand 40 when the two indicating hands should meet. The consequent change of angle in the minute hand because of such offset will obviously avoid the positive locking of the parts possible when the pressure rollers 23 or 24 descend, should the hands meet in exact parallelism or at a right angle one to the other. The dial 46 over which the hands 42 and 43 travel has its numerals and outline indicated on the plate 35 by raised characters in the same manner as that of the scale 41 above described. For convenience in printing the record the dial 46 is set in upon the face of the scale 41, to shorten the length of the combined surfaces the advantage of the arrangement resulting from the shortening of the record obtained.

The record made by pressure applied upon suitable flexible strips pressed against the parts 41 and 46 together with the movable hands described, will now be explained by reference to Figs. 4, 5, 6, 9 and 10 in which two sheets 47 and 48 are moved together vertically while in contact, over the type mechanism before described. The sheet 47 is usually a thin ply of paper only and is fed forward continuously. The sheet 48 has an outer ply of paper with an inner face of suitable ink or carbon material and travels at a uniform speed with the sheet 47. Upon these sheets, a carbon sheet 49 is presented outside the sheet 48 and in contact therewith, so that pressure applied upon the outer sheet 49 will tend to imprint the design of the before mentioned type upon both sheets 47 and 48.

Pressure is exerted upon the outside of the sheets 47, 48 and 49, towards the plate 35 by vertically reciprocating pressure rolls 23 and 24, each having a suitable surface adapted to the delicate pressure intended to be exerted thereby. The upper roll 23 is the longer and is mounted upon a shaft 50 whose ends 51 extend an appreciable distance beyond the rolls themselves and almost to the casing wall 10. The lower roll 24 is somewhat shorter than roll 23 and shaft ends 52 are correspondingly shorter than the ends 51. The two rolls are intended to move separately over the same surface of the said sheets, independently. In operation, the roll 24 will first travel downward over the outer surface of the plate 35 and the sheets thereon, and will remain near the bottom of the casing, so that the upper roll 23 may then be forced down into position adjacent the roll 24. Here they will remain until they are manually raised by the means now to be described.

A vertically reciprocating frame 17, before referred to, is provided at the printing end of the casing and is guided in its movement, partly by a transverse slot 53 in the upper wall of the casing 10 and further by vertical guide grooves 54 in the stationary structure in the same plane as the plate 35. These slots or grooves are followed by the spaced narrow bars 55 whose lower ends 56 are fashioned at one edge to form a toe portion which may engage the shaft ends 52 and when raised, lift the roll 24 to its normal position near the top of the casing. A short space from the lower end 56 of the bars 55, I provide laterally off-set extensions 57 which serve as projecting toe portions 58 for the ends 51 of the shaft 50, though the said toe portions 58 are perceptibly higher than the position of the lower ends 56, so that the roll 23 will be carried directly above the roll 24.

The toe portions 56 and 58 are always positioned beneath the shaft ends of their respective rolls, so that when the frame 17 is raised the rolls will be carried with them and away from the paper, but lowering the frame 17 does not necessarily lower the rolls. Near the upper portion of the casing frame, an outwardly projecting portion 59 of said frame affords an enlarged area within which are pivoted separate latches 60 and 61 whose upper ends may suitably swing inwardly against the respective rolls 23 and 24, to hold the latter in their uppermost position when they have been lifted by the frame 17. These latches 60 and 61 are pivoted to the walls of the said enlargement 59, upon the pins 62 and 63, respectively, upon which the latches may swing in a vertical plane toward and from the rolls, permitting the latter to travel upwardly past them, but locking them against falling when the frame is depressed, until extraneous means is operated to release them.

Actuation of the latches 60 and 61 is afforded by the provision of outwardly projecting lugs 64 and 65 which are normally given an upward stress by springs 66 and 67, one end of which is secured to the casing wall above the respective lug, to thereby afford a rocking movement of the latches counter clockwise as viewed in Fig. 6. Beneath the lugs are provided vertically slidable rods 68 and 69 which are attached to the respective lugs, at their upper ends, and extend downwardly through the wall of the casing protuberance 59 through suitable apertures in said wall. The lower ends of the rods are connected outside the casing by means of flexible steel wires 105 sliding in casings 125 and guided through suitable eyes 70 attaches to the frame at 71 and thence connected to the handle bars 72 and 73, respectively, where the two wires are provided with actuating thumb pieces 74 and 75, respectively.

To exert a continuous inward and direct pressure upon the rolls 23 and 24, and through them upon the flexible strips over the surface 39 of the plate 35, I provide a pair of spaced, vertical bars 76 which are bodily movable toward and from the said plate 35, as shown in Figs. 5 and 6. These bars are of a length equal to the approximate depth of the casing and have each an L-extension 77 on its lower end upon which the bar rides, and each L-extension has a horizontal slot 78 therein by which the bar is adjustable upon a pin 79 fixed in the frame, as shown.

Springs 80 are attached at their ends to the ends of the L and to the lower wall of the frame somewhat rearwardly of the bar 76, thus exerting rearward stress upon the lower end of the bars. The main portion of the bars 76 is straight, but at a point just beneath the position of the rolls 23 and 24 when the latter are in their highest position, the bars 76 are bent slightly forward from the plate 35 and then upwardly in parallelism with the main portion, as shown in Figs. 5 and 6. The upper ends of the bars 76 are yieldingly drawn rearwardly by springs 81 attached to the bars and to the frame at 82. When therefore, the rolls travel downwardly, they will move between the bars 76 and the strips 47, 48 and 49, as the bars are under the pressure of the springs 80 and 81 to force the strips against the outer surfaces of the hands 40, 42 and 43, as well as the type forms provided by the dials 41 and 46.

Means is provided for exerting a constant downward tendency to said rolls 23 and 24 against the stable force exerted by the latches 60 and 61 tending to hold the rolls in their uppermost position. Such normal downward force is exerted by flexible tapes 83 and 84, there being a pair 83 attached to the ends 52 of the shaft of roll 24, and another pair of tapes 84 attached to the ends 51 of shaft 50 of roll 23 and guided suitably downwardly and rearwardly as shown in the drawings.

Upon the forward or outward surface of the plate 35, I provide four pressure springs 85 arranged in pairs, one pair near the upper edge of the plate and the lower pair closely adjacent the lower edge, the springs of each pair being widely spaced apart laterally, and serving to hold the record sheets normally out of contact with the plate, but permitting the sheets to be pressed against the surface 39 by the rolls 23 and 24.

The several record sheets are fed forward and upward preparatory to printing and after the printing operation, in the following manner:—The two sheets 47 and 48 are wound up together in a single roll or spool 86 which is mounted upon a transverse shaft 87 whose ends extend into apertures in the side walls of the casing 10 where they are retained by small outer caps 88, the spool being positioned slightly rearward of the plate 35 and just above the level of the lower edge of the plate. From this spool the interwound sheets 47 and 48 are fed forward and downwardly and then upwardly over the springs 85. By feeding the double sheets in this manner, the paper sheet 48 with its inner carbon face in contact with the paper sheet 47, the combined sheets form the equivalent of separate paper sheets having an intermediate carbon sheet.

As the double sheets leave the spool 86, they are first directed about the guide roller 89 which is positioned just beneath the lower edge of the plate, the latter receiving these double sheets from the guide. After the sheets have been drawn upward along the plate 35, they are then guided toward the glass cover 13 by an upper guide roll 90 above a horizontal support plate 91 and beneath the frame plate 16, the latter being spaced upwardly from the plate 91 sufficiently to receive the two sheets 47 and 48 therebetween. In this position, the sheet 48 will appear in the space 15 of the frame 16.

At the rear edge of the plate 91, a narrow flange 92 is bent downward and thereby serves as a guide to direct the sheet 47 downwardly and slightly forwardly about a reeling spool 93 which is mounted for rotation upon a transverse shaft 94 whose ends are supported in bearings 95, and one of the ends extending through one of the side walls of the casing 10 and provided with a key 96 upon the outside of the casing, so that the reel 93 may be operated to wind up the record strip 47 upon whose surface an impression has been printed by the carbon surface of the sheet 48, when the two have received the pressure of the proper roller as the latter has travelled over the combined strips. It is to be understood that the sheets 47 and 48 are to be separated at the inner edge of the plate 16 just above the flange 92, from which point a sheet or strip of the sheet 48 will be torn off and the sheet 47 wound up on the reel 93.

The carbon strip 49 is stored upon the roller 97 which is positioned immediately beneath the guide roller 89, the carbon strip being directed upwardly upon the outside surface of sheet 48, and reeled up, above the roller 90, upon the roller 98, the strip 49 being separated from strip 48 as it is reeled upon the said roller. The following means is provided for actuating the roller 98. The ends of this roller are rotatably mounted in bearings 99 on the inner surface of the walls of the casing. The shaft of said roller is provided with a ratchet wheel 102 at one end just outside the outline of the roll, the teeth of the ratchet being actuated by a pawl 100 carried upon a swinging lever 120 actuated by a pin 101 which in turn is carried by one of the bars 55, so that the lifting of the frame 17 will rotate the ratchet wheel and thereby rotate the roller 98. The pawl 100 is normally held in its lowermost position by the vertical spring coil 103 whose lower end is attached to the outstanding pin 110 mounted on the frame plate 35. Spring catch 104 holds the ratchet normally.

Upon the shaft 87, as shown in Figs. 6 and 7, is loosely mounted a spool 86 in the intermediate portion thereof, a friction brake 106 serving to avoid too loose unreeling of the combined sheets 47 and 48. Outside such spool and adjacent the respective walls of the casing 10, are mounted small reels 107 each having coiled thereon the tapes 84 which are guided beneath the guides 89 by the same shaft that bears the spool 97, and thereafter extend upward and attached to the ends 51 of the shaft 50 bearing the roller 23. The reels 107 are secured to the shaft 87 for rotation therewith. There is also mounted upon shaft 87 a coil spring 108 positioned outside the spool 86, and between it and the reel 107, at the end of the shaft opposite the brake 106. The inner end of this coil is fixedly secured to the shaft, while the outer end of said coil is fixedly secured to the bottom wall of the casing 10, just beneath the shaft, as at 109, so that raising the roller 23 will wind up the spring coil 108 and thereby place a pulling strain upon the tapes 84 tending to lower the roller 23.

At the rear of the shaft 87 is mounted a reel shaft 121 for rotation in bearings in the walls of the casing 10, and having fixed thereon spaced reels 111 from which the tapes 83 are unreeled against the force of the coiled spring 112 whose outer end is fixed at 113 to the casing wall. The tapes 83 are guided forwardly and downwardly underneath the spool 86 by guide rolls 114 mounted upon the shaft 115 rotating in bearings 116, and from them forwardly and upwardly by the rolls 117 from which they are attached to their roller 24 at its ends 52, as shown clearly in Fig. 4. It will be evident from the views in Figs. 6 and 8 that raising the rollers 23 and 24 by lifting the frame 17, will wind up the springs 108 and 112. Rolls 117 are mounted on shaft 118 rotating in bearings 119.

The relation of the parts 105 and 125 is that of a longitudinally movable inner element within a flexible outer casing, in somewhat the manner in which the shaft 18 is enclosed in the armored casing 19, except that the steel wires 105 are not intended for rotation, nor for any function other than lengthwise movement to actuate the rods 68 and 69, and thereby operate the latches 60 and 61 to permit the traveling downward of the pressing rolls 23 and 24 for the printing function. For this reason, the wires 105 fit far more tightly within the casings 125, than do the shafts 18 within the armor 19. The parts 105 and 125 are shown diagrammatically only in Fig. 1, the relative position of the wires 105 within the casings 125 being shown in detail in Figs. 2, 5 and 6.

As before stated, the casing 10 is secured transversely of and fixedly upon the bar 11 of the vehicle frame. The main body of said casing includes the end thereof showing the dial 22, needle 14, and glass shield 13 protecting the said dial, these parts being shown as positioned at the right hand end of Fig. 2 of the drawings, and at the left in Fig. 6. This is the end receiving the parts 18 and 19 connected with the vehicle wheel, and is somewhat shallower than the opposite end, as shown clearly in Fig. 6. The casing end 122 carrying the dial 41 and the printing mechanism, together with the vertical plate 35 and the time piece 21, receives therein connections with the control members 105, and is hingedly connected with the main body of the casing 10 at the points 123 on the lower wall of said casing, so that the entire end 122 may swing outwardly and downwardly upon the said hinges for the purpose of removing the completed record from the spool 93, and again refilling the spool 86 with fresh strips 47 and 48. A lock mechanism is provided for holding the casing end 122 in its closed position, and will now be explained in detail.

This lock mechanism is shown in detail in Fig. 11 of the drawings, and portions in section in Figs. 6 and 12. Certain portions are shown in side elevation in Fig. 7. The purpose of the lock is to normally hold the parts of the casing 10 in closed position, when once the hinged end 122 has been swung rearwardly sufficient to permit locking the same. It comprises the parallel and transverse bolts 124 and 126 positioned adjacent the flange 92 and just beneath the horizontal plate 91. These bolts are mounted for longitudinal sliding movement in a series of staples or U-plates 127 secured to the plate 91. Certain staples 128 are provided at the sides of the plate to serve as mortises for the ends of the respective bolts. A coil spring 129 connects lugs 130 on the respective bolts to thrust the latter normally into said mortises.

The effect of said spring will hold the bolts (which are carried by the casing end 122) in locked relation with the main body of the casing 10. A lever 131 is pivoted to the bolt 126 and receives in a slot 132 loosely a pin 133 carried by the bolt 124. The lever 131 is also provided intermediate its ends with an M-slot 134 designed to receive a key of corresponding shape whereby actuation of the key will swing the lever 131 against the force of the spring 129, and remove the bolts from the stationary mortises, and thereby permit opening of the casing end 122, as above explained.

A key hole 135 is provided in the edge of the plate 16, adjacent the plate opening 15, just above the M-slot 134, to permit insertion of a suitable key for operating the lock. A corresponding opening is provided in the lower plate 91, so that insertion of the key in plates 16 and 91, will necessarily pierce the paper layers 47 and 48, and thereby positively indicate, both on the record slip of Fig. 3, and the continuous strip 47, that the casing had been opened.

It is to be understood that the downward travel of the pressing rolls 23 and 24 will operate to press the paper strips toward and against the characters and designs on the outer surface of the plate 35. The lifting of the frame 17 and bars 55 with their toe portions 56 and 58, serves to raise said rolls 23 and 24 against the force of the tapes 83 and 84. It is however essential that when said rolls are raised, they shall be held outwardly out of touch with the several strips 47, 48 and 49, until a downward force is again exerted upon the rolls 23 and 24. This is accomplished by the provision of outwardly extending projections 136 mounted upon the outward surface of the plate 35 in the plane of the bar 76, so that raising the roll 23 will position the latter somewhat outwardly by contact with such projection.

The lower pressing roll 24 when raised to its highest point will contact outstanding projections 137 to position such roll out of contact with the paper strips, as shown clearly in Figs. 5 and 13.

The operation of the device is as follows:—
The casing 10 being mounted securely upon the frame bar 11 of a motor vehicle with the right hand end of the casing (as shown in Fig. 2) positioned upon the right hand side of such bar 11, as the viewer faces toward the front wheel from the rear in Fig. 1, and the steel wires 105 leading from the left hand end of the casing to the thumb hooks 74 and 75 of the handle bars; and assuming that the rotating shaft 18 suitably connected with the axle or other driving element of the vehicle wheel 20, so that the shaft 18 will actuate the speedometer to drive both the hands 14 and 40, and record the total distance travelled; and assuming that the time piece 21 is in operation regularly driving the hands 42 and 43 of the dial as shown in Fig. 4; further assuming that the frame 17 has been raised as shown in Figs. 4 and 5, the motor vehicle is started forward.

Further, until the motor vehicle starts forward the hands 14 and 40 will normally point to the zero mark of the dials, the springs 85 hold the strips 47, 48 and 49 out of contact with the characters on the surface 39, the springs 80 and 81 are normally pressing the bars 76 against the rolls 23 and 24 to hold the latter yieldingly against the projections 136 and 137, and the springs 66 and 67 normally raise the rods 68 and 69 to their uppermost limit and thereby hold the latches 60 and 61 in position to lock the pressing rolls in their uppermost position. Meanwhile, the hinged portion 122 of the casing 10 is locked in closed position by the outward thrust of the lock bolts 124 and 126 by the strain exerted by spring 129. A short edge of the strip 48 will extend slightly over the dial 12, so that the same may be grasped by the hand when it is desired to pull the strip out from under the upper plate 16, the position of the strip 48 being as shown in Figs. 2, 6, 11 and 12.

As the vehicle starts forward by the rotation of the wheel 20, the latter rotates the shaft 18 and the extension 25 thereof, and thereby actuates the worm 31, and rotates the vanes of the centrifugal mechanism 26, so that the rack 28 by longitudinal movement will tend to rotate the gears 29 and 38, and thereby move the hands 14 and 40 to indicate the varying speed of the vehicle. As the vehicle speed increases, the rider may look forward and down upon the top portion of the casing and note the varying position of the hand 14 upon the scale 27. At this time, a horizontal portion of the sheet 48 which has previously been drawn upward from the guide roll 89 adjacent the surface 39 and upward and over the guide roll 90, may be seen in the opening 15 of the plate 16. The sheet 47 having taken the same course, is beneath the sheet 48 and extends downwardly over the lip 92 and wound upon the spool 93.

Whenever either of the pressing rolls 23 or 24 descends from its position indicated in Figs. 4, 5, 6 and 13, to a position adjacent the lower edge of the plate 35, the spring pressed bars 76 tend to force the rolls toward the surface 39 bearing the hands 42 and 43 of the time piece and the hand 40 carried by the shaft 37, together with the scale 41 and dial 46, as shown in Fig. 4, thereby printing the record of the time and speed upon the sheets 47 and 48 with the aid of the carbon strip 49. It is to be understood that the sheets 47 and 48 are advanced upwardly along the outer face of the plate 35, but out of contact therewith by manually rotating the shaft 94 by the key 96, while the strip 49 is raised by actuating the roll 98 by raising the frame bars 55 manually.

Assuming that the vehicle is traveling at a speed above a proper one, for some reason, and that it is the desire and intention of the driver to not only make an accurate record upon the strip 47 to be rolled up on the spool 93, but also to have a duplicate record of the same data upon the strip 48 which may be readily separated from the main strip and indicate the speed and time upon a ticket so separated, for indicating the data in somewhat the manner shown in Fig. 3, the driver will, while retaining his hands upon the handle bars 72 and 73, and at the proper time, press the thumb piece 75 thereby exerting a pulling action upon the wire 105 and thereby pulling downward upon the rod 69, overcoming the upward stress of the spring 67, whereby the latch 61 is released beneath the roll 24, so that the tapes 83, under the stress of the spring 112, will draw the roll 24 down across the surface 39 and its type forms above explained, until said roll rests upon the toe portions 56 of the frame bars 55. Usually, the frame 17 is raised before the vehicle starts forward, but of course, the frame 17—55 must be lowered manually before either of the thumb pieces is actuated to permit the rolls 23 and 24 to be lowered.

Raising the frame 17—55 lifts both rollers 23 and 24 to the uppermost position where they are latched in the upper position by the latches 60 and 61, until the latter are released separately by the thumb-pieces, as above explained. A first record of the speed, and time when the record is made, is printed on the strips 47 and 48 by the lowering of the lower roll 24, while the roll 23 remains in its upper position by the latch 60. A later record of speed and time may be made when the vehicle has advanced further, and may have attained a different speed, by actuating the thumb piece 74 which will release the latches 60 and thereby permit the lowering of the pressing roll 23 and thereby make another record on a later surface or area of the strips 47 and 48. Ordinarily, the strip key 96 will be actuated manually and sufficiently to advance the strips after printing the first record, and before or after the next record is printed.

It will obviously be essential to raise the frame 17—55 to thereby lift the rolls 23 and 24 to the upper and latched position. Figs. 4 and 5 of the drawings show the said frame and the rolls in the position thus far attained. The driver then will lower the frame 17—55 leaving the rolls 23 and 24 in their upper position, as they are shown in Fig. 6. The two records of speed are then made in due sequence after the one raising of the frame and rolls, as above explained. It is therefore quite certain that the strip 47 must be continuously advanced and reeled upon the inner spool 93 until the lock bolts 124 and 126 are released, and that the bolts cannot be released without actuation by the key inserted in the opening 135. A complete record of all printed statements on such strip is thus made on the spool 93 which cannot well be mutilated or removed without unlocking the casing portion 122, and the key cannot be utilized for the purpose of mutilation and removal without puncturing the strips 47 and 48 thereby indicating such operation.

It will be clear that the strips 47 and 48 are advanced upwardly across the plate 35 by the manipulation of the shaft 94 by the key 96, but that the upward advance of the carbon strip 49 at small intervals, is caused by the rising and falling of the frame 17 one bar of which carries the pin 101. As these three strips are pressed toward the surface 39 by one of the rolls 23 or 24, an impression is made upon each of the strips 47 and 48, in the manner shown in the upper part of the ticket appearing in Fig. 3, the radial lines shown upon the larger and upper scale of such view representing the speed printed by the hand 40 (as shown in Fig. 4), independently by the rolls 23 and 24, thus indicating a particular speed when 24 descends, and a different speed upon the descent of roll 23. The radial lines upon the smaller scale 46 and shown upon the central portion of the ticket, indicate the time when the several speed impressions were taken.

It is to be further noted, especially by reference to Fig. 6 of the drawings, that the speed that the vehicle is moving, will not only be indicated by hand 40 upon the paper strips, but will also be indicated by the hand 14 upon the upper surface of the scale 27, so that the rider may view the hand 14 through the glass 13, and ascertain his traveling speed before printing such a ticket as is shown in Fig. 3. This enables a traffic policeman to make valuable use of a vehicle equipped with such a mechanism.

When such an officer provided with a vehicle such as a motorcycle so equipped sights a speeding vehicle which is apparently traveling at an unlawful speed, the officer mounts his motorcycle and pursues rapidly. While traveling at high speed, such a speed as will obviously tend to overtake the unlawful speeder, and without removing his hands from the steering bars, the officer jerks the thumb hook 75 and thereby permits roll 24 to be pulled down across the surface 39.

The record of the time when the record was made, and of the speed that the vehicle was moving, will then be made upon the sheets 47 and 48 while in their vertical position.

As soon as the officer has reached trailing distance from the pursued party, only slightly in the rear of the speeder, the officer slows down to the speed of the autoist he is following (such speed will be evident by the uniform distance between the two vehicles), and then actuates the other thumb hook 74 which will at once permit a record to be made on the two sheets 47 and 48, by the descent of the roller 23.

After the record is made (double record), the officer speeds up alongside the speeder and halts him, after which he may rest his hand on the glass portion 13, as shown in Fig. 2, and with pencil or pen enters the proper data in the blank space on the sheets while the latter are in the horizontal opening 15, so such data will appear in the manner indicated in Fig. 3. Identical data is entered on both strips 47 and 48. The officer then lifts the frame 17—55 and at once depresses the same, which operation lifts rolls 23 and 24 and latches them in the upper position, ready for another and separate use, in another arrest.

It will be understood that the lower speed shown on the ticket torn from the sheet 48, indicates the speed unlawfully attained by the pursued autoist, the higher speed printed being the speed of the pursuing vehicle while overtaking the said autoist.

When the officer returns to his main office, the swinging part 122 of the casing 10 may be unlocked by a suitable key inserted in the opening 135, and the roll 93 inspected by proper authority, or removed entirely for the substitution of another spool.

The printing of the data upon the sheets 47 and 48 having been accomplished by the descent of the respective rollers 23 and 24, the said sheets are advanced by rotating the reel 93 by turning the key 96, as will be evident in Figs. 7 and 8. The continuous strip 47 is so wound, while the sheet 48 will be separated from sheet 47 and presented to the officer on the upper surface of the glass 13 and torn off by him as notices of arrest for presenting to the offender.

My invention is designed especially for motorcycle police, and I believe its use will largely prevent false charges against drivers who are traveling within legal limits. It is evident that the clock record on the notice of arrest will tend to prevent the officer from withholding the notice from a speeder who is inclined to bribe, since such notice presented to another speeder would expose the officer through discrepancy in the hour shown on the ticket. The office record will be kept on a long strip with sections numbered serially, and the casing 10 locked in closed position until released by the key inserted at 135 in the plate 16. While my improvement has a wide field of usefulness for police officers, I by no means intend to restrict the use of the device above explained, to this particular official class. Obviously, any motor-cycle or other power driven vehicle, may be equipped with such mechanism and used to advantage.

It will be apparent that vehicles other than motor-cycles may be equipped with my device and used for making speed records as above explained—for example, a vehicle so equipped may be trailed behind another vehicle whose speed is to be accurately determined and recorded.

Having thus fully described my invention, what I claim and desire to secure by Letters Patent, is—

1. In a device of the character described adapted to be driven by a vehicle and having connected indicating and recording hands for simultaneous and equal operation under speed changes of the vehicle, a clock having a recording dial and recording hands cooperating therewith and manually controlled recording means cooperating with said recording hands of both the speedometer and the clock and the clock dial to make a record of the time and speed of the vehicle at the time at which the recording operation is performed.

2. In a device of the character described adapted to be driven by a vehicle and having connected indicating and recording hands for simultaneous and equal operation under speed changes of the vehicle, a clock having a recording dial and recording hands cooperating therewith, recording means cooperating with said recording hands of both the speedometer and the clock to make a record of the time and speed of the vehicle at the time at which the recording operation is performed, and manual means connected to the recording means and adapted to be positioned on the vehicle within easy access of the operator for actuating the recording means when desired.

3. In a device of the character described adapted to be driven by a vehicle and having connected indicating and recording hands for simultaneous and equal operation under speed changes of the vehicle, a clock having a recording dial and recording hands cooperating therewith, a plate arranged beneath said recording hands and clock dial, superposed record strips supported over the plate, springs carried by the plate for normally spacing the record strips therefrom, a spring actuated roller for passage over the record strips to press the same against said recording hands and dial, latch means for normally holding the roller at one end of the plate, manual trip means adapted to be mounted on the vehicle and connected to said latch means for releasing the roller at times for operation, and means for returning said roller out of contact with said strips into inition position.

In testimony whereof, I have hereunto subscribed my name this 4th day of March, A. D. 1929.

JAY HIRAM GREENLEY.